United States Patent [19]
Muto et al.

[11] Patent Number: 5,782,563
[45] Date of Patent: Jul. 21, 1998

[54] ROLLING BEARING UNIT

[75] Inventors: Yasushi Muto; Banda Noda; Tatsunobu Momono, all of Fujisawa, Japan

[73] Assignee: NSK Ltd., Tokyo, Japan

[21] Appl. No.: 915,380

[22] Filed: Aug. 20, 1997

Related U.S. Application Data

[63] Continuation of Ser. No. 613,295, Mar. 11, 1996, abandoned.

[30] Foreign Application Priority Data

Mar. 10, 1995 [JP] Japan ................ 7-051156
Mar. 10, 1995 [JP] Japan ................ 7-051158

[51] Int. Cl.$^6$ ............... F16C 33/58; F16C 33/32
[52] U.S. Cl. ............... 384/450; 384/492; 384/516
[58] Field of Search ............... 384/492, 491, 384/513, 516, 565, 450, 625

[56] References Cited

U.S. PATENT DOCUMENTS

| | | | |
|---|---|---|---|
| 3,471,913 | 10/1969 | Scott | 384/513 X |
| 5,396,135 | 3/1995 | Iwazaki et al. | 384/450 X |
| 5,411,336 | 5/1995 | Takemura et al. | 384/492 |
| 5,443,317 | 8/1995 | Momono et al. | 384/491 |

FOREIGN PATENT DOCUMENTS 4041489  6/1992  Germany ................ 384/565

OTHER PUBLICATIONS

FP Wardle; Vibration Forces Produced by Waviness of the surfaces of thrust loaded ball bearings. Part 1; 1988, vol. 202, No. C5 pp. 305–312.

Primary Examiner—Thomas R. Hannon
Attorney, Agent, or Firm—Helfgott & Karas, P.C.

[57] ABSTRACT

A rolling bearing unit having undulation on the rolling surfaces of the rolling elements where the total value of the wave components having an even number of waves per circumference is smaller than the total value of the wave components having an odd number of waves per circumference, or having undulation on the inner ring raceway and outer ring raceway, where the undulation on at least one of the raceway is conditioned such that the maximum waviness amplitude among $(nZ)$, $(nZ+1)$ and $(nZ-1)$ waves per circumference is smaller than the maximum waviness amplitude among $(nZ+2)$ and more waves per circumference, where n is a positive integer and Z is the number of rolling elements, thereby making it possible to obtain a low-cost, high-performance rolling bearing in which the vibration characteristics of the rolling bearing are improved without having to increase the precision required for manufacturing the rolling elements and inner ring raceway and outer ring raceways.

6 Claims, 8 Drawing Sheets

ROLLING BEARING UNIT

This is a continuation of application Ser. No. 08/613,295, filed Mar. 11, 1996 abandoned.

FIELD OF THE INVENTION

The rolling bearing unit of this invention is used for the rotation support section of a hard disk drive (HDD) or video tape recorder (VTR).

DESCRIPTION OF THE PRIOR ART

The rotation support section of a HDD or VTR comprises a rolling bearing as shown in FIG. 1. A first raceway or outer ring raceway 2 is formed around the inner peripheral surface of a first bearing ring or outer ring 1, and a second raceway or inner ring raceway 4 is formed around the outer peripheral surface of a second bearing ring or inner ring 3. Several rolling elements (balls) 5 are located between the outer ring raceway 2 and the inner ring raceway 4 so that they can rotate freely, allowing the aforementioned outer ring 1 and inner ring 3 to rotate freely with respect to each other. The rolling elements 5 are held in a retainer 6 so that they can rotate freely.

Of the rolling bearings constructed as described above, those built into a HDD or VTR require a very high level of rotation precision. For example, in the case of a rolling bearing assembled with the motor spindle for an HDD, which is sometimes referred to as miniature bearing, high rotation precision is necessary in order that the information on the magnetic disk which is rotated by this motor spindle can be read accurately magnetic head. Therefore conventionally, the roundness of the rolling elements 5 of the rolling bearing assembled with the motor spindle was improved, and processing errors in the rolling surface of the rolling elements 5 and the aforementioned raceways 2, 4 were kept to a minimum. The term "roundness" is used in the present specification to mean a degree that the deviation from circular or spherical form is null or minute.

However, unpreventable minute rough areas, that is undulation, due to processing remain on the rotating surfaces of the rolling elements 5 of the rolling bearing.

In other words, due to this undulation, the distance between the outer ring raceway 2 and inner ring raceway 4 which is based on the diameter of the rolling elements 5, changes minutely as the rolling elements 5 rotate. Also, due to this undulation, the distance between the outer surface of the outer ring 1 and the inner surface of the inner ring 3 changes minutely as the rolling elements 5 rotate.

As a result, the position relationship of the inner peripheral surface of the inner ring 3 with respect to the outer peripheral surface of the outer ring 1 or the position relationship of the outer peripheral surface of the outer ring 1 with respect to the inner peripheral surface of the inner ring 3 changes minutely as shown by the graph in FIG. 2, and causes vibration.

The displacement shown along the vertical axis of the graph shown in FIG. 2, is the amplitude of vibration of the rolling bearing. This vibration is repeated every time the inner ring 3 (or outer ring 1) also the amount or vibration (amount of displacement) and its position differ a little for each rotation, causing an non repetitive runout 6. In other words, the position relationship of the outer ring 1 and inner ring 3 cannot be reproduced, causing different vibrations for each rotation. As a result, as more information is accumulated on the magnetic disk, there is a possibility for more reading or writing errors occurring in the magnetic head. Therefore, increasing the density of the HDD is restricted from the viewpoint of the performance of the rolling bearing.

As can be seen, in order to increase the density of an HDD, it is necessary to decrease the non repetitive runout of the rolling bearing. Moreover, this non repetitive runout is decreased if the roundness of the rolling elements is improved so that the undulation of the rolling surface of the rolling elements is decreased. However, improving the processing precision of the rolling elements and outer and inner raceways has almost reached a limit, therefore it is very difficult to reduce the aforementioned non repetitive runout by improving the roundness of the rolling elements and outer and inner raceways. Moreover, even if the roundness could be improved, the cost would increase, and thus the cost of manufacturing an HOD with a rolling bearing having the improved rolling elements would become high.

SUMMARY OF THE INVENTION

The rolling bearing of this invention to overcome was invented with the above problems, provides a rolling bearing unit which makes it possible to reduce the non repetitive runout even if the roundness of the rolling elements (balls) is not improved.

An object of this invention is to provide a rolling bearing unit which makes it possible to reduce the non repetitive runout without particularly improving the roundness of the outer ring raceway on the inner peripheral surface of the outer ring and the inner ring raceway on the outer peripheral surface of the inner ring.

DETAILED DESCRIPTION OF THE PREFERRED EMBODIMENTS

The rolling bearing unit in one feature of this invention, as in the conventional rolling bearing unit, comprises a first bearing ring having a first raceway, a second bearing ring having a second plurality of rolling elements which are located between the first and second raceways, and where there is minute undulation on the rolling surfaces of the rolling elements. Also, with respect to the undulation peak components on the rolling surfaces of the aforementioned rolling elements, the total value (square value) of wave components having an even number of waves per circumference is less than the total value of wave components having an odd number of waves per circumference.

It is noted that the wave component having an even number of waves per circumference has a large bad effect on the vibration characteristics.

In the case of the rolling bearing unit of this invention constructed as described above, with respect to all of the rolling surfaces of the rolling elements, since the total value of wave components having an even number of waves, is less than the total value of wave components having an odd number of waves, it is possible to reduce the non repetitive runout.

Since the total value of wave components having an odd number of waves has a smaller bad effect on the vibration characteristics, it is not necessary to reduce the total value of wave components having an odd number of waves.

Also, it is possible to improve the vibration characteristics and reduce the non repetitive runout without particularly improving the roundness of the rolling elements.

The reason why it is possible to improve the vibration characteristics without particularly reducing the total value of wave components having an odd number of waves if the total value of wave components having and even number of waves is made small is explained in FIGS. 3(A),3(B),4(A) and 4(B).

The vibration due to the minute undulation on the rolling surfaces of the rolling elements occurs when there are changes in the diameter of the rolling elements because of the undulation. Moreover, if the change in diameter is large, the vibration characteristics become poor and the non repetitive runout becomes large.

Figure 3A:
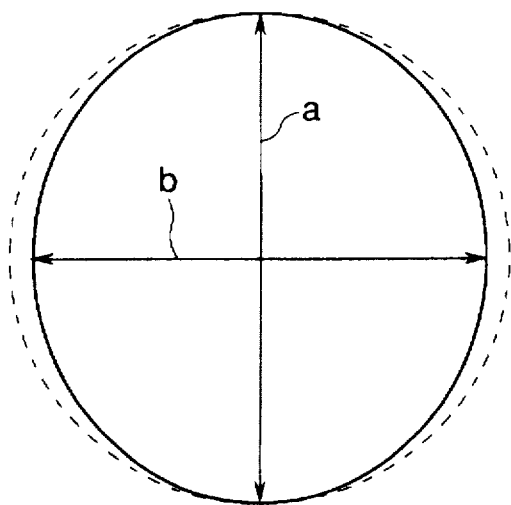
FIGS. 3(A) and 3(B) show two examples of an even number of waves on the rolling elements.
Figure 3B:
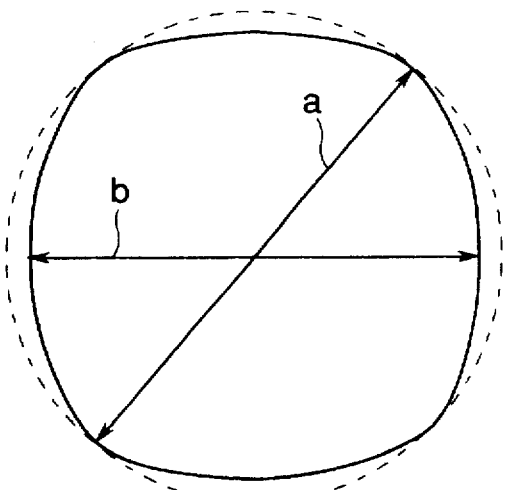
Figure 4A:
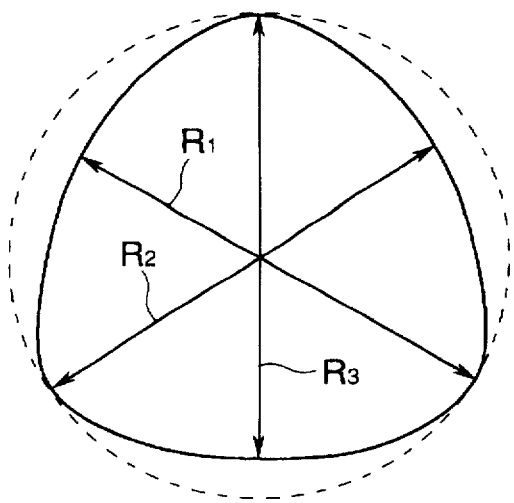
FIGS. 4(A) and 4(B) show two examples of an odd number of waves on the rolling elements.
Figure 4B:
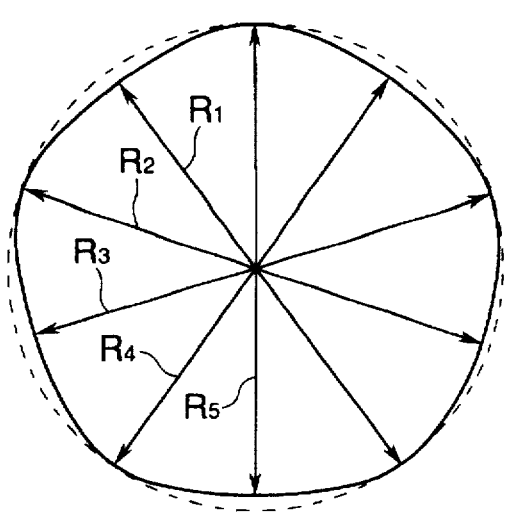

In FIGS. 3(A) and 3(B), the number of waves in undulation is even, with FIG. 3(A) showing two lobes, and FIG. 3(B) showing four lobes, where the dashed lines show the true circle. As can be seen in FIGS. 3(A) and 3(B), when the number of waves is even, both ends of the diameter of the rolling element are simultaneously at the top or bottom of the waviness. Moreover, the difference between diameter "a", connecting the tops of two lobes, and diameter "b", connecting the bottoms of two lobes, becomes substantially large. As a result, the wave component having an even number of waves has a large effect on the vibration characteristics FIGS. 4(A) and 4(B), the number of waves is odd, with FIG. 4(A) showing three lobes, and FIG. 4(B) showing five lobes. As can be seen from FIGS. 4(A) and 4(B), when the number of waves is odd., one end of the diameter of the rolling element is located at the top of a wave (peak) while the other end is located at the bottom of a wave (valley). The difference between one diameter which includes the top of a wave and another diameter which includes the top of another wave, is very small. For example, in FIG. 4(A), $R_1=R_2=R_3$, and in FIG. 4(B), $R_1=R_2=R_3=R_4=R_5$. As a result, the wave component having an odd number of waves has a small affect on the vibration characteristics.

If the total value of wave components with an even number of waves is reduced, it is possible to improve the vibration characteristics without reducing the total value of wave components with an odd number of waves.

Using conventional technology, in order to improve the vibration characteristics of the bearing, it was necessary to make small the undulation in the number of both odd and even waves, however in this invention the undulation in the wave components having an odd number of waves does not need to be made small too much.

Also, from the point of manufacturing the rolling elements, manufacturing by allowing the undulation in the wave components with an odd number of waves is easier, so that the time required for manufacturing the rolling elements is less than in the conventional method, and it is possible to manufacture rolling elements for the rolling bearing with excellent vibration characteristics. Moreover, it is possible to reduce the cost of manufacturing the rolling elements and the rolling bearings in which they are assembled.

In another feature of this invention, as in the conventional rolling bearing unit, the rolling bearing unit comprises a first bearing ring having a first raceway, a second bearing ring having a second raceway, and rolling elements, Z in number, which are located between the first and second raceways, and where there is minute undulation on the surfaces of the aforementioned raceways.

Particularly, in the rolling bearing unit of this invention, provided that n is taken to be a positive integer, the maximum waviness amplitude among (nZ), (nZ+1), and nZ −3 waves per circumference around the aforementioned raceways are all less than the maximum waviness amplitude among (nZ+2) and greater waves per circumference, and this is true for at least one of the bearing rings and for at least one of the n values.

In the rolling bearing unit of this invention constructed as described above, since the maximum waviness amplitude among (nZ), (nZ+1), and (nZ−1) waves per circumference, which have a large bad effect on the vibration characteristics, are small, it is possible to make the non repetitive runout small.

Since the bad effect on the vibration characteristics by the maximum waviness amplitude among (nZ+2) and greater waves per circumference is small, it is not necessary to reduce the maximum waviness amplitude among (nZ+2) and greater waves compared to the current value. Furthermore, it is possible to improve the vibration characteristics and reduce the non repetitive runout without particularly improving the roundness of the raceways.

Figure 1:
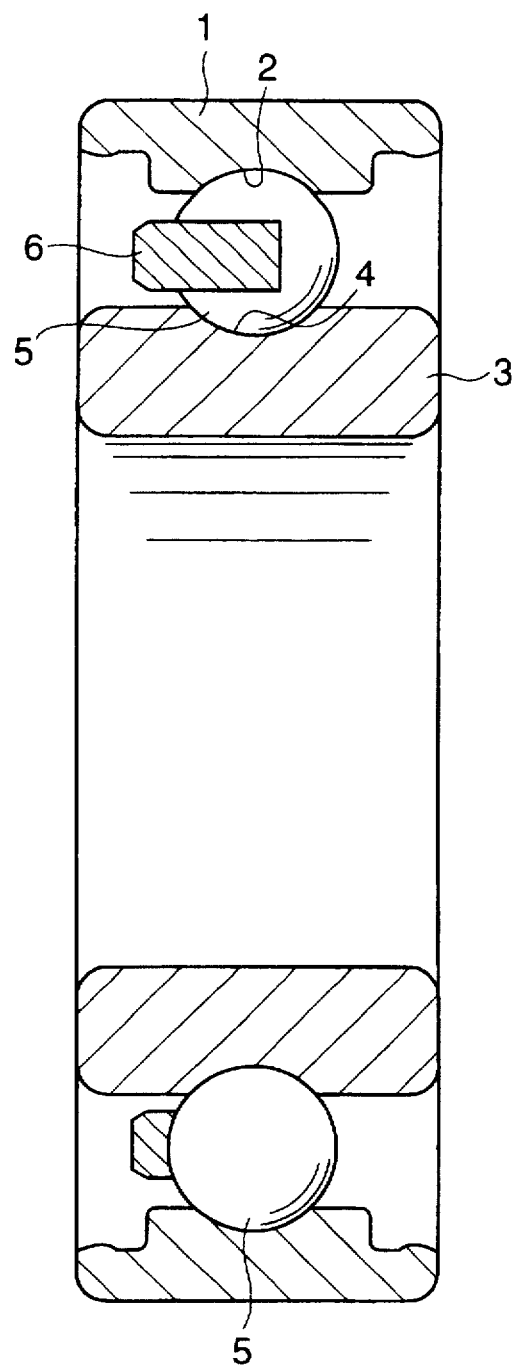
FIG. 1 is an enlarged cross-sectional view of one example of the rolling bearing to which this invention is applied.
Figure 2:
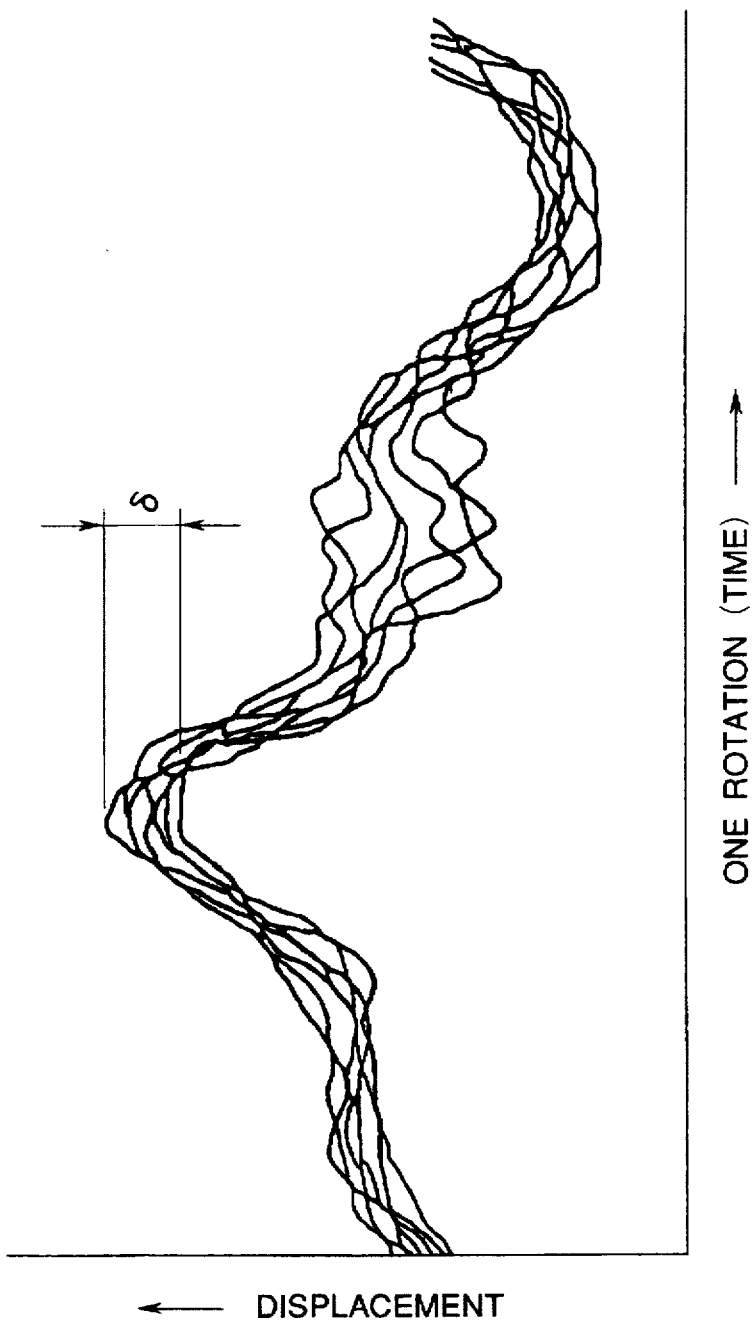
FIG. 2 is a graph showing the vibration characteristics of the rolling bearing of FIG. 1.

The reason that it is possible to improve the vibration characteristics without particularly reducing the maximum waviness amplitude among (nZ+2) and greater waves so long as the maximum waviness amplitude among (nZ), and (n1±1) waves are small, is as follows:

In a ball bearing having a deep groove, as shown in FIG. 1, or in an angular ball bearing, when the inner ring 3 rotates with a constant axial load (for example preloading), vibration occurs in the inner ring 3 with reference to the outer ring 1, having a frequency as shown in Table 1 below.

TABLE 1

| | Number of waves in undulation | | Vibration frequency of bearing | |
|---|---|---|---|---|
| | Radial direction | Axial direction | Radial direction | Axial direction |
| Inner ring | nZ ± 1 | nZ | $nZf_i \pm f_r$ | $nZf_i$ |
| Outer ring | nZ ± 1 | nZ | $nZf_c$ | $nZf_c \cdot pa$ |

In Table 1, n is a positive integer, Z is the number of rolling elements 5, $f_r$ is the rotation speed (Hz) of the inner ring 3, $f_c$ is the rotation speed (Hz) of the retainer, and $f_i = f_r - f_c$.

As can be clearly seen from Table 1, the inner ring 3 vibrates with respect to the outer ring 1 due to the undulations having the number (nZ+1) and (nZ−1) of waves in the radial direction, and due to the number (nZ) of waves in the axial direction. The reason for this is explained using FIGS. 9(A), 9(B), 9(C), 10(A), 10(B) and 10(C).

Figure 9A:
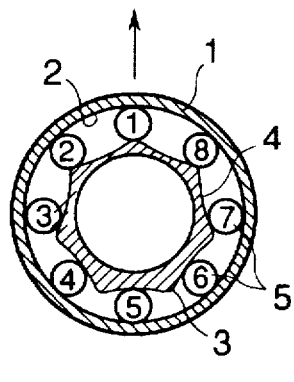
FIGS. 9(A), 9(B) and 9(C) are partly cutout, simplified cross sectional views of the rolling bearing used in explaining the effects of the undulation on the inner ring raceway on the vibration in the radial direction.
Figure 9B:
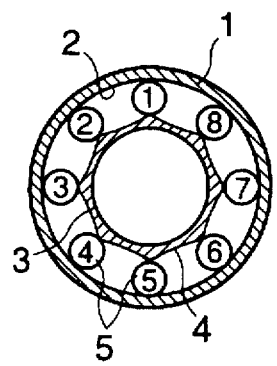
Figure 9C:
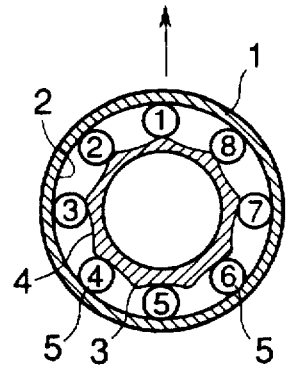

First, the reason for the vibration due to the undulations having the number (nZ+1) and (nZ−1) of waves in the radial direction is explained using FIGS. 9(A), 9(B), and 9(C).

FIG. 9(A) shows the undulation having the (nZ−1) waves, FIG. 9(B) shows the undulation having (nZ) waves, and FIG. 9(C) shows the undulation having the (nZ+1) waves on the surface of the inner ring raceway 4. As shown in FIG. 9 (B), when there are (nZ) waves, all of the rolling elements 5 are located on the top (or the bottom) of the lobes at the same time, therefore there is very little displacement (vibration) in the radial direction of the outer ring 1 and inner ring 3.

With respect to this, as can be seen in FIG. 9(A) for (nZ−1) elements 5 will be located at the top of the lobe (1 in FIGS.) 9(A) and 9(C)) while the rolling element 5 on the opposite side in the radial direction will be located at the bottom of the lobe (5 in FIGS. 9(A) and 9(C)). As a result, the outer ring 1 displaces with respect to the inner ring 3 in the radial direction (up in FIGS. 9(A) and 9(C)), and vibration will occur with the frequency as shown in Table 1. Also, the maximum amplitude of vibration in the radial direction is proportional to the maximum waviness amplitude of the undulation having (nZ+1) waves in FIG. 9(C) or (nZ−1) waves in FIG. 9(A).

Figure 10A:
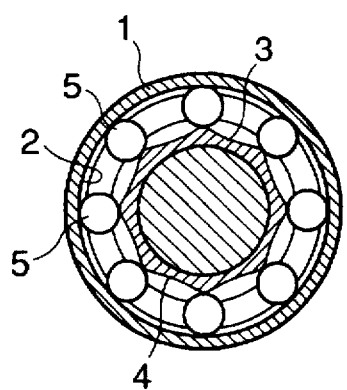
FIGS. 10(A), and 10(B) are simplified vertical cross sectional views of the rolling bearing used in explaining the effects of the undulation on the inner ring raceway on the vibration in the axial direction.
Figure 10C:
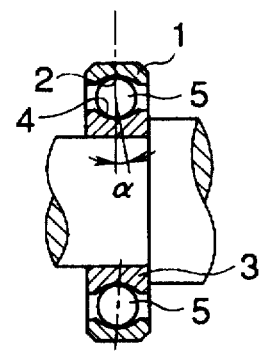
FIGS. 10(C) and 10(D) corresponding to FIG. 10(A) and 10(B) respectively, are simplified side elevational views of the rolling bearing used in explaining the effects of the undulation on the inner ring raceway on the vibration in the axial direction.
Figure 10B:
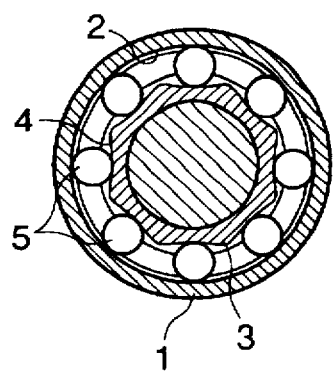
Figure 10D:
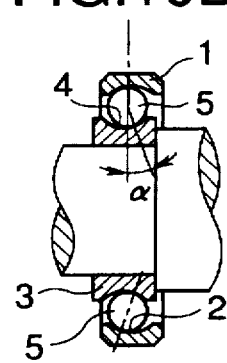

Next, the reason for the vibration in the axial direction due to the undulation having (nZ) waves, is explained using FIGS. 10(A), 10(B), 10(C), and 10(D). When there are (nZ) waves, all of the rolling elements 5 repeatedly alternate between being simultaneously located at the top of the lobes, as shown in FIG. 10(A), and at the bottom of the lobes, as shown in FIG. 10(3). At the moment when all of the rolling elements 5 are simultaneously located at the top of the lobes, as shown in FIG. 10(A), the contact angle "α" by the pressure (preload) on the rolling elements 5 becomes small as shown in FIG. 10(C). However, at the moment when all of the rolling elements 5 are simultaneously located at the bottom of the lobes, as shown in FIG. 10(B), the contact angle "a" by the pressure (preload) on the rolling elements 5 becomes large as shown in FIG. 10(D). As a result, the aforementioned outer ring 1 displaces in the axial direction with respect to the inner ring 3, and vibration occurs at a frequency as listed in Table 1. Moreover, the maximum amplitude of the vibration in the axial direction is proportional to the maximum waviness was amplitude of (nZ) waves.

Therefore, of the undulations on the inner ring raceway 4 (or on the outer ring raceway 2), the undulation having the number of waves, (nZ±1), is the cause of vibration in the radial direction, and the undulation having the number of waves, (nz), is the cause of vibration in the axial direction.

As can be seen from the explanation above, for the undulations having a number of waves other than (nZ) and (nZ±1), in other words having (nZ+2) and more of waves, there is very little effect on the vibration in both of the radial and axial directions.

Furthermore, as mentioned above, because the maximum waviness amplitude among (nZ) and (nZ±1) waves on the raceways of the rolling bearing unit of this invention is small, it is possible to reduce the non repetitive runout and improve the vibration characteristics without reducing the maximum waviness amplitude among (nZ+2) and greater waves. Since it is not necessary to reduce the maximum waviness amplitude among (nZ+2) and greater waves, manufacturing the bearing rings becomes easier, and it is possible to hold down the manufacturing cost of the bearing rings and the rolling bearing unit in which these bearing rings are assembled.

Figure 5:
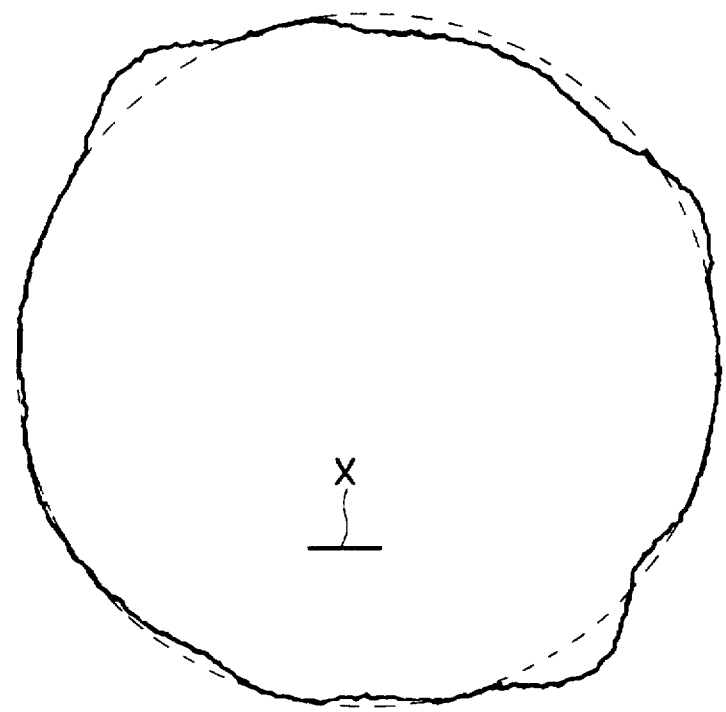
FIG. 5 shows the roundness of a rolling element that is outside the technical range of this invention.
Figure 6:
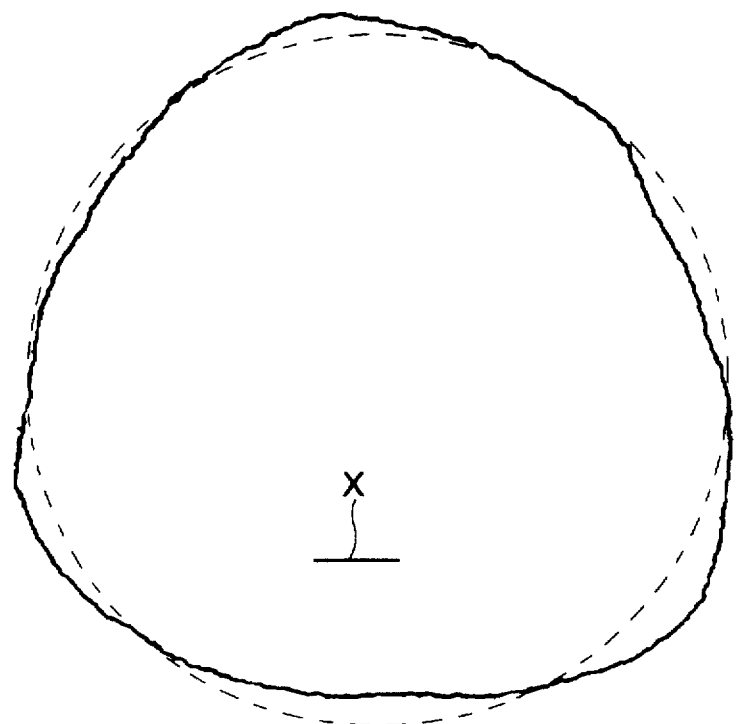
FIG. 6 shows the roundness of a rolling element that is within the technical range of this invention.

Next, an experiment for confirming the effectiveness of one feature of the invention will be described. In the experiment, rolling elements whose roundness of the rolling surface was as shown in FIG. 5 and FIG. 6, were used. The dashed lines in FIGS. 5 and 6 show the true circle, and the solid lines show the actual roundness of the rolling surface of the rolling elements Moreover, the length of line "X" in the figure is 0.1 μm.

The number of waves on the rolling elements having this kind of rolling surface and the peak amplitude of vibration (half of the amplitude of the sinusoidal displacement) were found through harmonic analysis, and the results are shown in Tables 2 and 3. Table 2 shows the measurement results for the rolling elements shown in FIG. 5, and Table 3 shows the measurement results for the rolling elements shown in FIG. 6.

The numerical values in the vertical column on the left of each table is the reference number N for waves. Also, the values in the horizontal row at the top of each table are values to be added to the reference number N, wherein N+0, N+1, N+2, N+3, and N+4 are the wave component in this specification. Moreover, the units used for the peak amplitude in the tables are μm.

For example, in the second row from the top in Table 2 (N=5), the value, 0.003, listed in the column at the far right (N+4), shows that when the number of waves on the rolling surface of the rolling element shaped as shown in FIG. 5 is 9, the peak amplitude is 0.003 μm. Furthermore, in the fourth row from the top in Table 3 (N=15), the value, 0.001, listed in the column at the very left (N+0), shows that when the number of waves on the rolling surface of the rolling element shaped as shown in FIG. 6 is 15, the peak amplitude is 0.001 μm.

TABLE N2

| | N + 0 | N + 1 | N + 2 | N + 3 | N + 4 |
|---|---|---|---|---|---|
| 0 | | — | 0.010 | Δ0.005 | 0.010 |
| 5 | Δ0.002 | 0.006 | Δ0.001 | 0.007 | Δ0.003 |
| 10 | 0.004 | Δ0.002 | 0.002 | Δ0.002 | 0.003 |
| 15 | — | — | Δ0.004 | 0.003 | — |
| 20 | — | Δ0.003 | 0.002 | — | — |
| 25 | Δ0.002 | 0.002 | Δ0.002 | — | Δ0.001 |

TABLE N2-continued

| | N + 0 | N + 1 | N + 2 | N + 3 | N + 4 |
| --- | --- | --- | --- | --- | --- |
| 30 | 0.002 | Δ0.002 | — | Δ0.001 | 0.002 |
| 35 | — | — | Δ0.001 | 0.001 | — |
| 40 | — | Δ0.002 | 0.001 | — | — |
| 45 | Δ0.002 | — | — | — | Δ0.002 |
| 50 | — | — | — | — | — |
| 55 | — | — | Δ0.001 | — | — |
| 60 | — | — | 0.001 | Δ0.001 | 0.001 |
| 65 | — | — | — | — | — |
| 70 | — | — | — | — | — |
| 75 | Δ0.002 | — | — | — | — |
| 80 | — | — | — | — | — |
| 85 | — | — | — | — | — |
| 90 | — | Δ0.002 | — | — | 0.001 |
| 95 | Δ0.001 | 0.002 | — | — | — |
| 100 | — | — | — | — | — |
| 105 | — | 0.001 | — | 0.001 | — |
| 110 | — | — | 0.001 | Δ0.001 | — |
| 115 | — | — | — | — | — |
| 120 | 0.001 | — | — | — | — |
| 125 | — | — | — | — | — |

TABLE 3

| | N + 0 | N + 1 | N + 2 | N + 3 | N + 4 |
| --- | --- | --- | --- | --- | --- |
| 0 | — | — | 0.006 | Δ0.028 | 0.005 |
| 5 | Δ0.004 | 0.002 | Δ0.003 | 0.001 | Δ0.002 |
| 10 | — | — | — | Δ0.001 | 0.001 |
| 15 | Δ0.001 | 0.002 | — | — | — |
| 20 | 0.001 | — | — | Δ0.001 | — |
| 25 | — | — | — | — | — |
| 30 | — | — | — | — | — |
| 35 | — | — | Δ0.001 | — | — |
| 40 | 0.001 | Δ0.002 | — | — | — |
| 45 | — | — | — | — | — |
| 50 | — | — | — | — | — |
| 55 | — | — | — | — | — |
| 60 | — | — | — | — | — |
| 65 | — | — | — | — | — |
| 70 | — | — | — | — | — |
| 75 | — | — | — | — | — |
| 80 | — | — | — | — | — |
| 85 | — | — | — | — | — |
| 90 | — | — | — | — | — |
| 95 | — | 0.001 | — | — | — |
| 100 | — | — | — | — | — |
| 105 | — | — | — | — | — |
| 110 | — | — | — | — | — |
| 115 | — | — | — | — | — |
| 120 | — | — | — | — | — |
| 125 | — | — | — | — | — |

As can be seen from Tables 2 and 3, there are many wave components with different number of waves in the rolling surface of a certain rolling element. For example, for the rolling surface of the rolling element shaped as shown in FIG. 5, the number of waves in the wave components, as can be seen in Table 1, is between 2 to 14, and 17 and 18, with very few having 15 and 16 waves.

The values for the peak amplitudes in Tables 2 and 3 indicated with a triangular mark are for the wave component having an odd number of waves, and the values with no marks, are for the wave component having an even number of waves. The lateral lines in the tables indicate surfaces with no undulation.

From Table 2, the total value and the maximum waviness amplitude of wave components having an even number of waves, and the total value and maximum waviness amplitude of wave components having an odd number of waves are found as described below for rolling elements shaped as shown in FIG. 5.

The term "total value" here means the sum of the square of the peak amplitude of the waves.

For the wave components having an even number of waves: Total value=$0.010^2+0.010^2+0.006^2+0.007^2+0.004^2+0.002^2+0.003^2+0.003^2+0.002^2+0.002^2+0.002^2+0.002^2+0001^2+0.001^2+0.001^2+0.001^2+0.002^2+0.001^2+0.001^2+0.001^2$=0.000351

Maximum waviness amplitude=0.010 (for 2 and 4 waves)

For the wave components having an odd number of swells: Total value=$0.005^2+0.002^2+0.001^2+0.0032+0.0022+0.002^2+0.004^2+0.003^2+0.002^2+0.002^2+0.001^2+0.002^2+0.001^2+0.001^2+0.002^2+0.002^20.002^2+0.001^2+0.001^2+0.002^2+0.002^2+0.001^2+0.001^2+0.001^2$=0.000112.

Maximum waviness amplitude=0.005 (for 3 waves)

As can be clearly seen, for the shape shown in FIG. 5, of the waviness, the total value for the wave components having an even number of waves is greater than the total value for the wave components having an odd number of waves, and the maximum waviness amplitude for even waves is greater than the maximum waviness amplitude for odd waves.

Next, the total value and the maximum waviness amplitude of the wave components having an even number of waves, and the total value and maximum waviness amplitude of the wave components having an odd number of waves are found as described below for rolling elements shaped as shown in FIG. 6.

For the wave components having an even number of waves: Total value=$0.006^2+0.005^2+0.002^2+0.001^2+0.001^2+0.002^2+0.001^2+0.001^2+0.001^2$=0.000074

Maximum waviness amplitude=0.006 (for 2 waves)

For the wave components having an odd number of waves: Total value =$0.028^2+0.004^2+0.003^2+0.002^2+0.001^2+0.001^2+0.001^2+0.002^2+0.002^20.00082$ Maximum waviness amplitude=0.028 (for 3 waves)

As can be clearly seen, for the shape shown in FIG. 6, of the waviness, the total value for the wave components having an even number of waves is less than the total value for the wave components having an odd number of waves, and the maximum waviness amplitude for even waves is less than the maximum waviness amplitude for odd waves.

The rolling elements shown in FIG. 5 and FIG. 6 were assembled in a rolling bearing as shown in FIG. 1 and the inner ring was turned. The vibration characteristics of the rolling bearing were then measured and the measurement results are shown in FIGS. 7 and 8.

Figure 7:
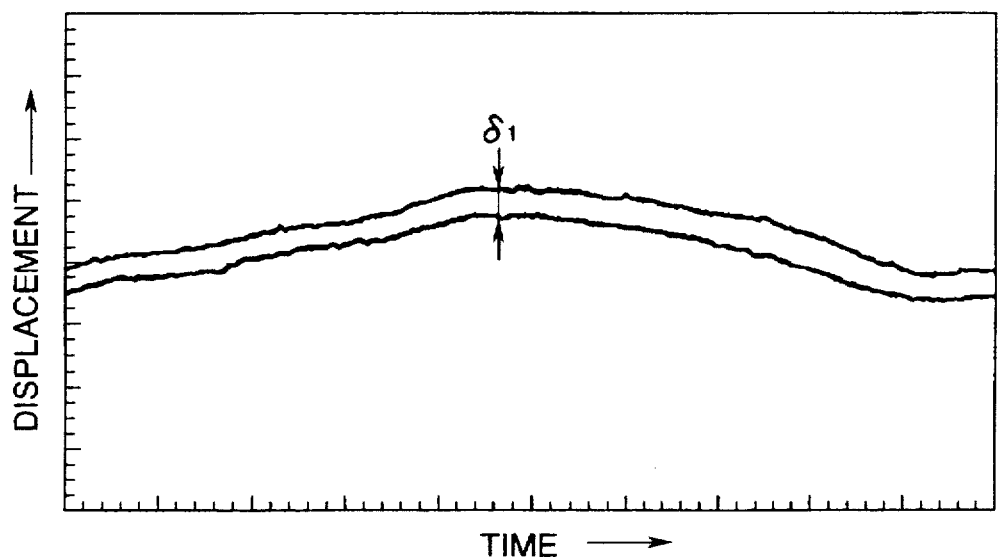
FIG. 7 is a graph showing the vibration characteristics of a rolling bearing assembled with the rolling elements shown in FIG. 5.
Figure 8:
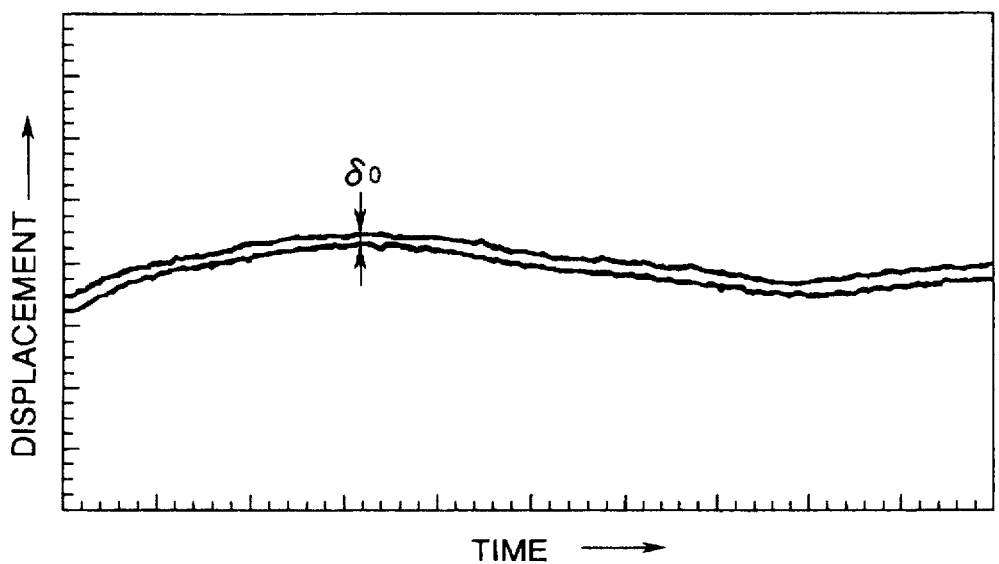
FIG. 8 is a graph showing the vibration characteristics of a rolling bearing assembled with the rolling elements shown in FIG. 6.

FIG. 7 shows the vibration characteristics of a roller bearing unit in which the rolling elements shaped as shown in FIG. 5 have been assembled, and where the total value of the wave components having an even number of waves is greater than the total value of the wave components having an odd number of waves in all of the rolling elements, and FIG. 8 shows the vibration characteristics of a roller bearing unit in which the rolling elements shaped as shown in FIG. 6 have been assembled, and where the total value of the wave components having an even number of waves is less than the total value of the wave components having an odd number of waves in all of the rolling elements. The scale of both the vertical and horizontal axes of the graphs shown in FIGS. 7 and 8 are equal.

As can be seen by comparing the measurement results shown in FIGS. 7 and 8, the non repetitive runout, "$\delta_0$", of the rolling bearing unit assembled with rolling elements shaped as shown in FIG. 6 within the technical range of this invention, is less than the non repetitive runout, "$\delta_1$", of the rolling bearing unit assembled with rolling elements shaped as shown in FIG. 5 outside the technical range of this invention ($\delta_0 < \delta_1$). From these results, it can be seen that the vibration characteristics of the rolling bearing are made superior with this inventions.

It is possible to manufacture just rolling elements whose total value of the wave components in the rolling surfaces with an even number of waves is less than the total value of the wave components in the rolling surfaces with an odd number of waves, but it is also possible to select out of several rolling elements, those whose total value of the wave components having an even number of waves is less than that of having an odd number of waves, and assemble the rolling bearing of this invention with those selected ones.

Furthermore, a rolling bearing having only rolling elements with rolling surfaces between a first and second raceways on the condition that the rolling surfaces are controlled such that maximum waviness amplitude of the wave components having an even number of waves is less than the maximum waviness amplitude of those having an odd number of waves is effective in reducing the non repetitive runout, however by adding this condition on the maximum waviness amplitude to the condition on the total value, it is more effective to suppress the non repetitive runout of the rolling bearing.

Figure 11:
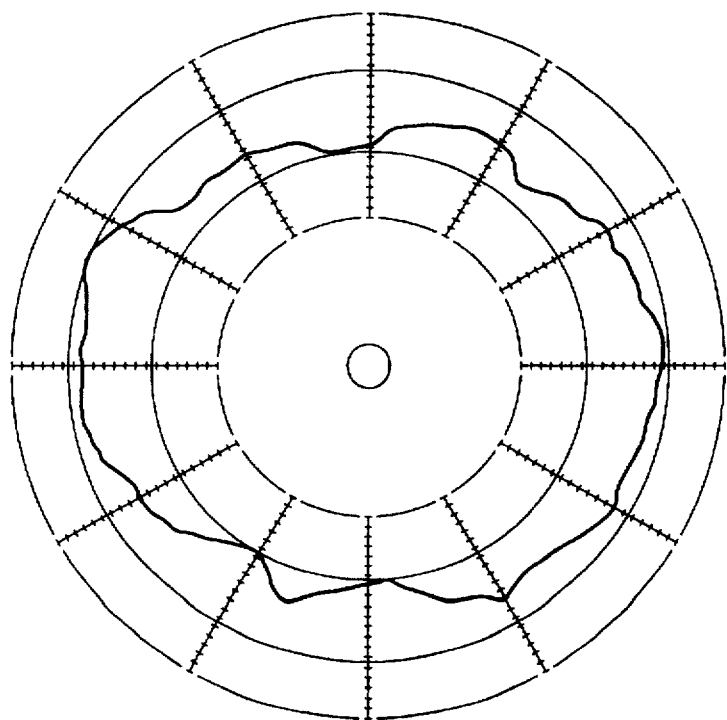
FIG. 11 shows the shape of an inner ring raceway that is outside the technical range of this invention.
Figure 12:
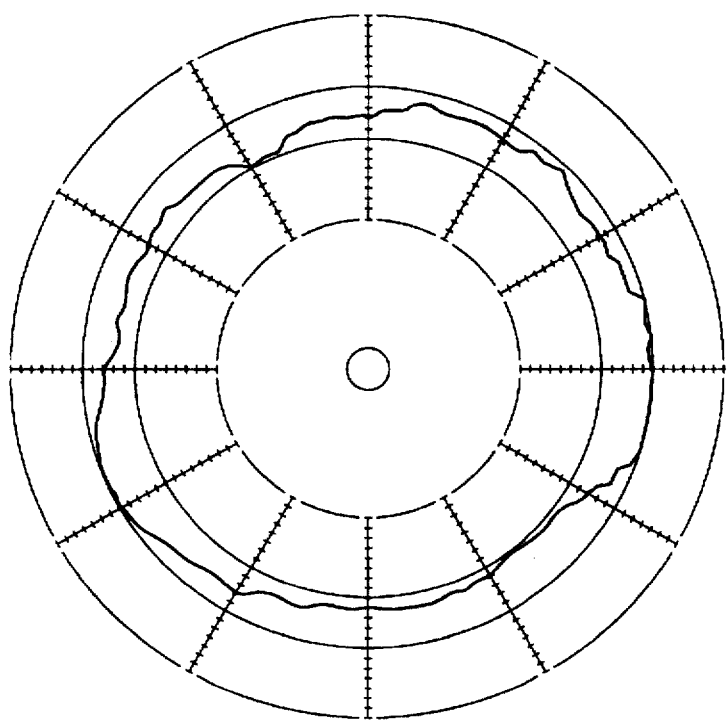
FIG. 12 shows the shape of an inner ring raceway that is within the technical range of this invention.

Next, an experiment for confirming the effectiveness of another feature of the invention will be described. In the experiment, an inner ring was used which had an inner ring raceway shaped as shown in FIG. 11, and another was used which had an inner ring raceway shaped as shown in FIG. 12. The graphs shown in FIGS. 11 and 12 show an exaggerated view of the undulation on the surface of the inner ring raceway (magnified by about 20,000). The number of waves and the peak amplitude of vibration (half the displacement amplitude of the sinusoidal shape change) of the inner rings having the inner ring raceways shaped as shown in the figures were found using harmonic analysis, and the results are shown in Tables 4 and 5 below.

Table 4 shows the measurement results for the inner ring shown in FIG. 11, and Table 5 shows the measurement results for the inner ring shown in FIG. 12.

The numerical values shown in the vertical column on the left side of Tables 4 and 5 are the number of waves. The number of rolling elements (balls), Z, assembled together with the inner ring to form the rolling bearing was 9.

Therefore, in the tables, the values for (nZ) are 9 and 18, and the values for (nZ+1) and (nZ-1) are 8, 10, 17 and 19. Also, in Tables 4 and 5, the peak amplitude is in units of μm. As can be seen from Tables 4 and 5, several values of number of waves was used.

TABLE 4

| Number of waves | Peak Amplitude |
| --- | --- |
| 2 | 0.247 |
| 3 | 0.071 |
| 4 | 0.037 |
| 5 | 0.032 |
| 6 | 0.047 |
| 7 | 0.015 |
| 8 | 0.069 |
| 9 | 0.021 |
| 10 | 0.062 |
| 11 | 0.029 |
| 12 | 0.022 |
| 13 | 0.006 |
| 14 | 0.010 |

TABLE 4-continued

| Number of waves | Peak Amplitude |
| --- | --- |
| 15 | 0.011 |
| 16 | 0.007 |
| 17 | 0.005 |
| 18 | 0.012 |
| 19 | 0.008 |
| 20 | 0.002 |

TABLE 5

| Number of waves | Peak Amplitude |
| --- | --- |
| 2 | 0.151 |
| 3 | 0.042 |
| 4 | 0.031 |
| 5 | 0.074 |
| 6 | 0.004 |
| 7 | 0.020 |
| 8 | 0.009 |
| 9 | 0.002 |
| 10 | 0.004 |
| 11 | 0.013 |
| 12 | 0.016 |
| 13 | 0.006 |
| 14 | 0.006 |
| 15 | 0.003 |
| 16 | 0.004 |
| 17 | 0.004 |
| 18 | 0.005 |
| 19 | 0.006 |
| 20 | 0.005 |

All can be clearly seen from both Tables 4 and 5. For the the inner ring raceway shown in FIG. 11, the maximum waviness amplitude among (nZ), (nZ+1) and (nZ-1) waves (0.069 for 8 waves) is greater than the maximum waviness amplitude among (nZ+2) and more waves per circumference (0.029 for 11 waves). Also, for the inner ring raceway shown in FIG. 12, the maximum waviness amplitude among (nZ), (nZ+1) and (nZ-1) waves (0.009 for 8 waves) is less than the maximum waviness amplitude among (nz+2) and more waves per circumference (0.016 for 12 waves).

The rolling bearing unit shown in FIG. 1 was assembled with inner rings having an inner ring raceways as shown in FIG. 11 and FIG. 12, and the inner ring was turned in order to measure the vibration characteristics of the rolling bearing unit.

Figure 13:
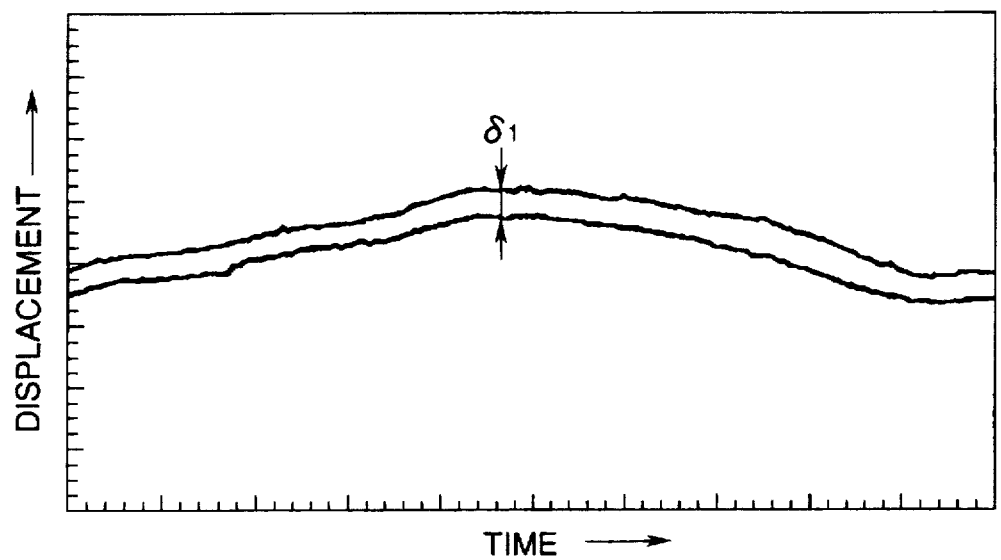
FIG. 13 is a graph showing the vibration characteristics of a rolling bearing assembled with an inner ring having an inner ring raceway as shown in FIG. 11.
Figure 14:
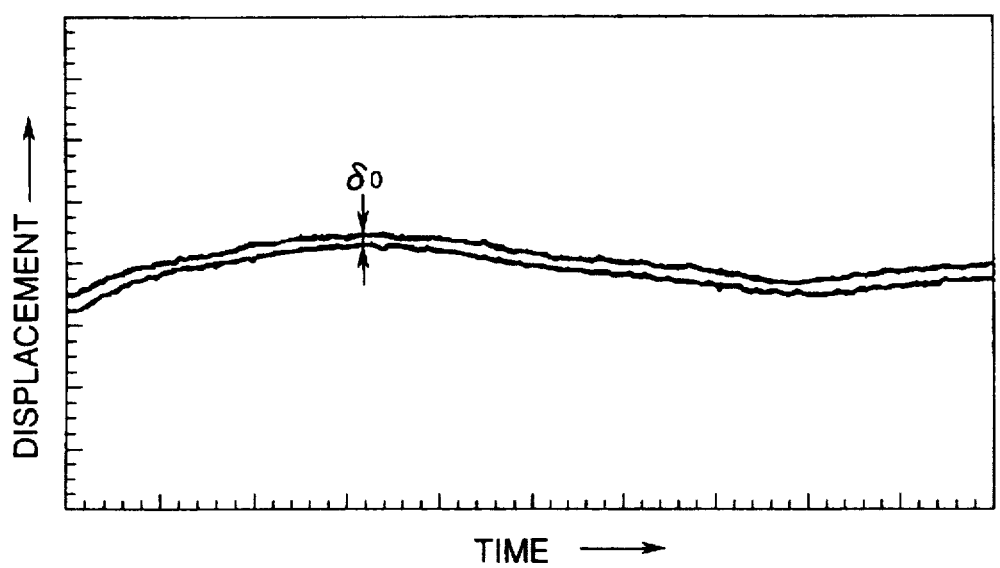
FIG. 14 is a graph showing the vibration characteristics of a rolling bearing assembled with an inner ring having an inner ring raceway as shown in FIG. 12.

The measurement results are shown in FIGS. 13 and 14. FIG. 13 shows the vibration characteristics of a rolling bearing unit assembled with an inner ring having an inner ring raceway as shown in FIG. 11, and FIG. 14 shows the vibration characteristics of a rolling bearing unit assembled with an inner ring having an inner ring raceway as shown in FIG.12. The scale of the vertical and horizontal axes in both FIG. 13 and FIG. 14 are equal.

As can be seen by comparing the measurement results shown in FIGS. 13 and 14, the non repetitive runout, "$\delta_0$", of the rolling bearing unit assembled with inner ring raceway shaped as shown in FIG. 12 within the technical range of this invention, is less than the non repetitive runout, "$\delta_1$", of the rolling bearing unit assembled with an inner ring raceway shaped as shown in FIG. 11 outside the technical range of this invention ($\delta_0 < \delta_1$).

Moreover, the roundness of the inner ring raceway shown in FIG. 12 does not found to be improved high, is easier to manufacture the inner ring having an inner ring raceway with such a shape. From these results, it can be seen that the vibration characteristics of the rolling bearing are made superior at an inexpensive cost with this invention.

By making the maximum waviness amplitude among (nZ), (nZ+1) and (nZ=1) waves less than the maximum waviness amplitude among (nZ+2) and more waves per circumference, the invention is effective even if the conditions are met for just one "n", or for just one raceway. However, to obtain even better results, it is best if the conditions are met for all "n", and for both raceway.

For the rolling bearing unit of this invention, the same superior results are obtained regardless of whether the bearing is used by rotating the inner ring, or used by rotating the outer ring. Moreover, this invention can be applied to not only a ball bearing, but also to a roller bearing as well. Furthermore, it can also be applied to not only a radial rolling bearing, but also to a thrust rolling bearing as well.

The rolling bearing unit of this invention, constructed and used as described above, makes it possible to improve the vibration characteristics of the bearing, including the non repetitive runout, without having to particularly improve the precision of manufacturing the bearing rings and rolling elements. As a result, it is possible to improve the performance of devices assembled with high-precision rolling bearings while at the same time keeping the manufacturing costs down, and thus make it possible to manufacture devices such as a high-performance HDD at about the same cost as is currently done.

What is claimed is:

1. A rolling bearing unit comprising a first bearing ring having a first raceway, a second bearing ring having a second raceway, and a plurality of rolling elements located between the first and second raceways, each rolling element having a rolling surface with minute undulation per circumference, where rolling surface has wave components per circumference such that the total value of the wave components per circumference comprising even numbers up to ten waves per circumference is less than the total value of the wave components per circumference comprising odd numbers up to nine waves per circumference, provided that the total value is the sum of the square of the peak amplitude of the wave components per circumference.

2. The rolling bearing unit of claim 1, wherein the maximum of the peak amplitudes of the wave components per circumference comprising even numbers of waves per circumference is smaller than the maximum of the peak amplitudes of the wave components per circumference comprising odd numbers of waves per circumference.

3. The rolling bearing unit of claim 2 for use in HDD.

4. The rolling bearing unit of claim 1, wherein the first and second raceways have wave components per circumference in minute undulations per circumference, respectively, and provided that the number of the rolling elements is Z, and that n is a positive integer, the condition that the maximum of the peak amplitudes of the wave components per circumference where the number of waves per circumference is nZ, the maximum of the peak amplitudes of the wave components per circumference where the number of waves per circumference is nZ+1, and the maximum of the peak amplitudes of the wave components per circumference where the number of waves per circumference is nZ−1 are all smaller than the maximum of the peak amplitudes of the wave components per circumference where the number of waves per circumference is nZ+2, is satisfied with respect to at least one of the number n and for at least one of the first and second raceways.

5. The rolling bearing unit of claim 4 for use in HDD.

6. The rolling bearing unit of claim 1 for use in HDD.

* * * * *